US009489436B2

(12) United States Patent
Walter

(10) Patent No.: US 9,489,436 B2
(45) Date of Patent: Nov. 8, 2016

(54) GATEWAY ENABLEMENT OF ANALYTIC DATABASE SERVICES

(71) Applicant: Wolfgang Walter, Heidelberg (DE)

(72) Inventor: Wolfgang Walter, Heidelberg (DE)

(73) Assignee: SAP SE, Walldorf (DE)

( * ) Notice: Subject to any disclaimer, the term of this patent is extended or adjusted under 35 U.S.C. 154(b) by 248 days.

(21) Appl. No.: 14/265,698

(22) Filed: Apr. 30, 2014

(65) Prior Publication Data

US 2015/0317348 A1    Nov. 5, 2015

(51) Int. Cl.
G06F 7/02 (2006.01)
G06F 17/30 (2006.01)

(52) U.S. Cl.
CPC ... *G06F 17/30557* (2013.01); *G06F 17/30289* (2013.01); *G06F 17/30345* (2013.01); *G06F 17/30377* (2013.01); *G06F 17/30867* (2013.01)

(58) Field of Classification Search
None
See application file for complete search history.

(56) References Cited

U.S. PATENT DOCUMENTS

| | | |
|---|---|---|
| 8,103,620 B2 | 1/2012 | Walter |
| 8,352,516 B2 | 1/2013 | Walter et al. |
| 8,656,414 B1 | 2/2014 | Walter et al. |
| 2007/0136079 A1 | 6/2007 | Beykirch et al. |
| 2008/0021911 A1* | 1/2008 | Murray ............. G06F 17/30233 |
| 2008/0109714 A1 | 5/2008 | Kumar et al. |
| 2008/0134059 A1 | 6/2008 | Kumar et al. |
| 2008/0162458 A1 | 7/2008 | Walter et al. |
| 2008/0162539 A1 | 7/2008 | Walter et al. |
| 2008/0250318 A1 | 10/2008 | Walter |
| 2010/0131616 A1 | 5/2010 | Walter et al. |
| 2011/0138337 A1 | 6/2011 | Walter et al. |
| 2013/0117710 A1 | 5/2013 | Walter et al. |
| 2013/0124807 A1* | 5/2013 | Nielsen ............... G06F 11/1438 711/162 |
| 2014/0033233 A1 | 1/2014 | Walter |
| 2014/0040320 A1 | 2/2014 | Walter |
| 2015/0019559 A1* | 1/2015 | Maquaire .......... G06F 17/30997 707/740 |

* cited by examiner

*Primary Examiner* — Bruce Moser
(74) *Attorney, Agent, or Firm* — Fish & Richardson P.C.

(57) ABSTRACT

An example database system comprises one or more database servers configured to serve database data of a database and configured to provide database services and a generic database gateway server coupled to the one or more database servers, the generic database gateway server configured to provide an interface to define analytic database services which can be called during run-time by inputting a uniform resource identifier at a user device to provide to the user device with database server data processed by one or more predefined analytic operations, the generic database gateway server being configured to obtain, during design time, a specification of an analytic database service by selecting database server data of the one or more database servers and one or more analytic operations to be applied on the selected data by the analytic database service, convert the obtained specification of the analytic database service into one or more objects in a format that can be processed on the one or more database servers, wherein the one or more objects include one or more analytic database service data objects specifying one or more attributes of the analytic database service and one or more analytic database service metadata objects, the one or more analytic database service metadata objects including annotations to the attributes of the one or more analytic database service data objects to be processed by the one or more database servers to implement the one or more predefined analytic operations and provide the one or more converted objects to the one or more database servers to be called by a user by inputting a uniform resource identifier.

20 Claims, 4 Drawing Sheets

GATEWAY ENABLEMENT OF ANALYTIC DATABASE SERVICES

TECHNICAL FIELD

The present disclosure relates to systems and methods for database applications. In particular, the present disclosure relates to a system which provides a gateway server for defining and implementing analytic database services.

BACKGROUND

Current database systems can store huge amounts of data. Moreover, current database systems can provide a multitude of different complex database services. In order to implement and manage these services in an efficient manner, database systems frequently employ proprietary programming languages with a considerable complexity. This makes it difficult for users who are not programmers and/or not familiar with the respective employed proprietary programming language to generate and maintain database services.

In addition, consumers of database services can be scattered around the world and there can be a desire to consume database services from a large variety of different platforms. It might require substantial effort to implement and maintain database services serving this large variety of different platforms. This might be particularly true for database systems employing proprietary programming languages, as standard communication platforms (e.g., web browsers) might not be adapted to request such database services directly.

SUMMARY

In a first general aspect of the present disclosure a database system comprises one or more database servers configured to serve database data of a database and configured to provide database services and a generic database gateway server coupled to the one or more database servers, the generic database gateway server configured to provide an interface to define analytic database services which can be called during run-time by inputting a uniform resource identifier at a user device to provide to the user device with database server data processed by one or more predefined analytic operations, the generic database gateway server being configured to obtain, during design time, a specification of an analytic database service by selecting database server data of the one or more database servers and one or more analytic operations to be applied on the selected data by the analytic database service, convert the obtained specification of the analytic database service into one or more objects in a format that can be processed on the one or more database servers, wherein the one or more objects include one or more analytic database service data objects specifying one or more attributes of the analytic database service and one or more analytic database service metadata objects, the one or more analytic database service metadata objects including annotations to the attributes of the one or more analytic database service data objects to be processed by the one or more database servers to implement the one or more predefined analytic operations and provide the one or more converted objects to the one or more database servers to be called by a user by inputting a uniform resource identifier.

In a second aspect according to the first aspect, the generic database gateway server is configured to automatically generate one or more of the annotations in the one or more analytic database service metadata objects in response to a corresponding input in the interface of the generic database gateway server by a designer.

In a third aspect according to the first or second aspect, the generic database gateway server provides one or more predefined types of analytic database services and corresponding predefined objects with predefined annotations in a format that can be processed on the one or more database servers, wherein the generic database gateway server is further configured to:
obtain, during design time, a selection of a predefined type of analytic database service;
obtain, during design time, one or more designer inputs for customizing the predefined type of analytic database service;
adapt the predefined type of analytic database service based on the one or more designer inputs.

In a fourth aspect according to any one the first to third aspects, the one or more database servers employ a proprietary programming language to implement database services.

In a fifth aspect according to the fourth aspect, the proprietary programming language employed to implement database services is SAP ABAP.

In a sixth aspect according to any one the first to fifth aspects, the one or more objects generated by the generic database gateway server are formatted according to a non-proprietary protocol with additional annotations.

In a seventh aspect according to the sixth aspect, the non-proprietary protocol is an Open Data Protocol.

In an eighth aspect according to any one the first to seventh aspects, the interface of the generic database gateway server provides an environment to allow a designer to explicitly define annotations in more analytic database service metadata objects.

In a ninth aspect according to any one the first to eighth aspects, the database system is configured to translate the one or more objects generated at the generic database gateway server into corresponding classes to be instantiated on the one or more database servers.

In a tenth aspect according to any one the first to ninth aspects, the annotations include one or more of one or more role annotations, which indicate that an attribute of the analytic database service data object is a dimension or a measure, wherein a dimension refers to a grouping of data items which are logically connected and a measure refers to a data item obtained by applying one or more analytic operations on other data items, a key annotation which indicates that an attribute of the analytic database service data object is a key of the analytic database service, a semantics annotation, which indicates that a database service allows analytic operations, one or more user interface annotations defining how returned processed database server data is to be presented on an interface of a user device consuming the analytic database service, a reference text annotation which includes a description of an annotated attribute, a reference attribute annotation which specifies one or more reference attributes which are semantically connected to the annotated attribute or a sortable status annotation or a filterable status annotation which indicate that an annotated attribute can be used for sorting or filtering in a user interface.

In an eleventh aspect according to any one the first to tenth aspects, the generic database gateway server is configured to provide a graphical user interface for a designer to specify the database server data and the one or more analytic operations.

In a twelfth aspect according to the eleventh aspect, the graphical user interface is configured to receive a selection of a predefined analytic database service by the designer, present a representation of the properties of the predefined analytic database service to a designer, allow the designer to customize on ore more properties of the predefined analytic database service and adapt the one or more objects of the predefined analytic database service upon receiving a customization by the designer.

In a thirteenth aspect according to the twelfth aspect, adapting the one or more objects of the predefined analytic database service includes setting or changing one or more annotations in the one or more analytic database service metadata objects of the analytic database service.

In a fourteenth aspect according to any one the first to thirteenth aspects, the database system is configured, during run-time, to obtain, at the generic database gateway server, a uniform resource identifier from a user device, the uniform resource identifier selecting a particular analytic database service, select and instantiate the one or more objects defined at the generic database gateway server during design time corresponding to the obtained uniform resource identifier, execute the analytic operations specified in the one or more objects on database server data at the one or more database servers and return, via the generic database gateway server, the processed database server data for consumption on the user device.

In a fifteenth aspect according to the fourteenth aspect, the returned processed data is formatted according to a non-proprietary language.

In a sixteenth aspect according to the fifteenth aspect, the non-proprietary language is an Extensible Markup Language.

In a seventeenth aspect according to any one of the fourteenth to sixteenth aspects, the returned processed database data includes one or more database tables.

In an eighteenth aspect according to any one of the fourteenth to seventeenth aspects, the database system is configured to obtain the uniform resource identifier via a Hypertext Transfer Protocol connection.

In a nineteenth aspect according to any one the first to eighteenth aspects, the database server data includes database data, runtime data one or more database servers, or both.

In a second general aspect of the present disclosure a computer implemented method includes obtaining, during design time, a specification of an analytic database service by selecting database server data of the one or more database servers and one or more analytic operations to be applied on the selected data by the analytic database service, converting the obtained specification of the analytic database service into one or more objects in a format that can be processed on the one or more database servers, wherein the one or more objects include one or more analytic database service data objects specifying one or more attributes of the analytic database service and one or more analytic database service metadata objects, the one or more analytic database service metadata objects including annotations to the attributes of the one or more analytic database service data objects to be processed by the one or more database servers to implement the one or more predefined analytic operations, the method further including providing the one or more converted objects to the one or more database servers to be called by a user by inputting a uniform resource identifier.

In a third general aspect of the present disclosure a computer readable medium storing instructions thereon which when executed by a processor cause the processor to obtain, during design time, a specification of an analytic database service by selecting database server data of the one or more database servers and one or more analytic operations to be applied on the selected data by the analytic database service, convert the obtained specification of the analytic database service into one or more objects in a format that can be processed on the one or more database servers, wherein the one or more objects include one or more analytic database service data objects specifying one or more attributes of the analytic database service and one or more analytic database service metadata objects, the one or more analytic database service metadata objects including annotations to the attributes of the one or more analytic database service data objects to be processed by the one or more database servers to implement the one or more predefined analytic operations, and provide the one or more converted objects to the one or more database servers to be called by a user by inputting a uniform resource identifier.

In a fourth general aspect of the present disclosure a computer implemented method includes the operations defined in any one of the first to nineteenth aspects.

In a fifth general aspect of the present disclosure computer readable medium storing instructions thereon which when executed by a processor cause the processor to perform the operations defined in any one of the first to nineteenth aspects.

DETAILED DESCRIPTION

Figure 1:
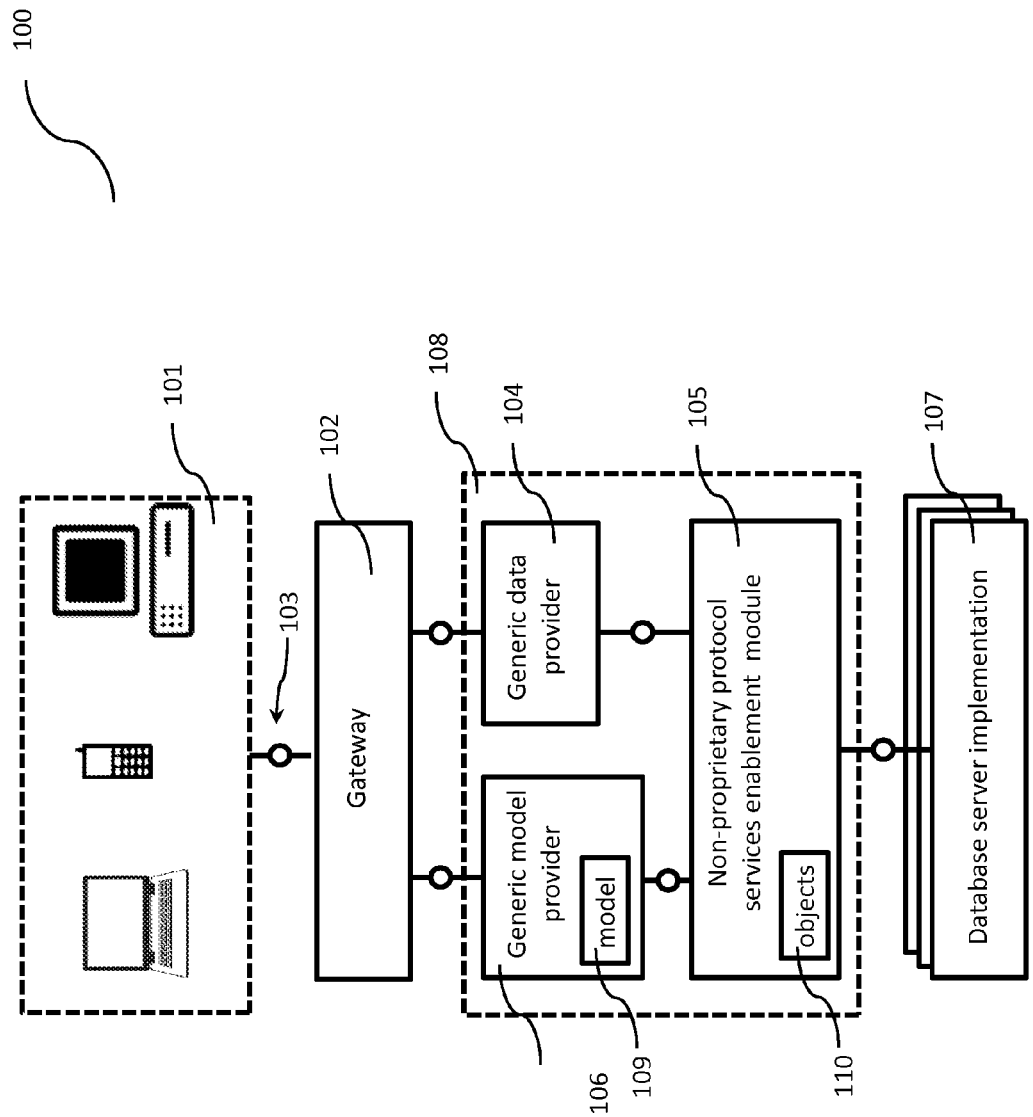
FIG. 1 illustrates an example database system with a generic gateway channel.

This disclosure relates generally to systems and methods for database applications. In particular, the present disclosure relates to a system which provides a gateway server for defining and implementing analytic database services.

The subject-matter described in this disclosure can be implemented in particular embodiments so as to realize one or more of the following advantages.

First, a user non-proficient in a proprietary language employed in a database system (e.g., SAP ABAP) can create and maintain applications using analytic database services.

Second, less coding might be required to implement analytic database services. As a consequence of the first and second advantages, total cost of ownership and total cost of development of analytic database services can be reduced.

In particular, analytic OData services (this term will be explained in further detail below) can be provided with reduced implementation time and by designers having limited programming knowledge.

Fourth, analytic database services can be provided that can be consumed by a large variety of user devices using non-proprietary platforms.

Before the systems and methods of the present disclosure will be discussed in more detail, the following sections introduce a set of general definitions.

As used herein, a "consumer" of a database service is an end user who calls the respective database service (or a particular method of the database service) from a user device. Processed database server data is returned to the consumer to be "consumed," i.e., used on the user device.

As used herein, a "designer" of a database service is a user who implements, changes or maintains a respective database service (or a particular method of the database service) via a user device. A particular user might act as a consumer or as a designer of an analytic database service at different times (which might be more difficult in some current database systems due to the required skill set to efficiently act as a designer).

As used herein, an "analytic database service" is a database service that provides database server data processed by one or more predefined analytic operations. An "analytic operation" can be any operation that goes beyond simple "CREATE" (i.e., an operation to create a database data item in a database of the database system), "READ" (i.e., an operation to read a database data item from a database of the database system), "UPDATE" (i.e., an operation to change a database data item in a database of the database system) or "DELETE" (i.e., an operation to delete a database data item from a database of the database system) operations. For instance, an analytic operation can be calculating an aggregate or average of a selection of database server data items. In other examples, an analytic operation can be determining a minimum, maximum or count of a selection of database server data items. In still other examples, an analytic database operation can include sorting or filtering a selection of database server data items according to one or more criteria. Analytic operations can include multiple different basic analytic operations.

As used herein, an "analytic database service" includes one or more methods that can be called by a consumer and that include the one or more analytic operations of the analytic database service. For instance, a method of an analytic database service can be an analytic "GET entity method" (or analytic "READ" method). If this method is called by a consumer, it returns a predetermined set of data items including data items processed by one or more analytic operations.

As used herein, the term "database server data" includes database data, runtime data of the one or more database servers configured to serve the database data of the database and configured to provide database services, or both. Subsequently, the systems and methods will be described using examples in which database data is processed by analytic database services. In these examples the data to be processed is retrieved from the database. However, the methods and systems can also be used to serve to a user runtime data of the one or more database servers processed by an analytic database service. For example, an analytic database service can provide information regarding the resources or workload of the one or more database servers (e.g., information regarding memory consumption or processor load). In one example, the analytic database service can access the information regarding the resources or workload of the one or more database servers via an application programming interface of an operating system of the one or more database servers. In another example, the one or more database servers can schedule background processes that perform certain tasks. An analytic database service can provide information relating to these background processes (e.g., information about the number of background processes which are currently running or are stopped). In other examples, the database server data can also include data retrieved from other sources as the database the one or more database servers are configured to serve database data from. In one example, the database server data includes data fed from a social network. Thus, an analytic database service as described herein can process this data fed from a social network and provide it to a user for consumption.

As used herein, an "annotation" refers to any additional metadata added to a data object formatted according to an industry standard or quasi-standard (e.g., the OData standardized protocol for database services).

Subsequently, the functional layout of an example generic database gateway server to create, maintain and provide analytic database services in a database system 100 will be discussed in connection with FIG. 1.

The database system includes one or more database servers 107, a generic database gateway server 108 which hosts the generic database gateway and a gateway 102 to connect the one or more database servers 107 to user devices 101.

Each of these components will be discussed in more detail subsequently. The one or more database servers 107 are configured to serve database data of the database and configured to provide database services. In order to do so, the database services are implemented as executable objects on the one or more database servers 107. In many current database systems, this requires that the database services be implemented in a proprietary programming language. For instance, a database server 107 can be an SAP ABAP server employing SAP ABAP which might require its database services to be implemented using SAP APAB (e.g., as a set of implementing SAP ABAP classes). Other database system might use different proprietary languages on their database application servers.

As already mentioned above, the layout of FIG. 1 is a functional layout of a database system. Therefore, the solutions described herein are not limited to a particular hardware solution. Even though the one or more database servers 107 can be hosted on backend server systems in one example, in other examples the one or more database servers can be hosted on other devices. For example, a cloud based database system might serve the database data and serve the database services described herein.

At the opposite "end," the database system 100, a user interface 101 can be used to access the database system and to consume database services. The user interface 101 can be hosted on any user device. For instance, a user device hosting the user interface 101 can be a desktop computer, a workstation or a mobile device (e.g., a laptop, a smartphone a tablet or a PDA). Multiple different software platforms can be used at the user device to provide the user interface 101. In one example, a web browser provides the user interface 101 on a user device.

A gateway 102 is provided in the database system 100 as an interface between the software platforms providing the user interface 101 on a user device and the database servers 107. The gateway 102 receives calls of database services from the user interfaces 101 and returns corresponding data items generated at the database servers 107 for consumption by the users. The gateway 102 can, e.g., process calls and returned data in a non-proprietary format (e.g., the OData format). This will be discussed in more detail below.

According to the implementation, a generic database gateway server 108 is provided between the user interfaces 101 and the database server 107. The generic database gateway server 108 can provide different functions during design-time and during run-time of the database system 100.

On the one hand, during design-time, the generic database gateway server 108 provides an interface to define analytic database services which can be called during run-time by inputting a uniform resource identifier at a user device to provide to the user device with database data processed by one or more predefined analytic operations. This includes obtaining, during design time, a specification of an analytic database service by a designer. The designer can select, on the interface, database data of the one or more database servers and one or more analytic operations to be applied on the selected data by the analytic database service. The generic database gateway server 108 converts the obtained specification of the analytic database service into one or more objects (110) in a format that can be processed on the one or more database servers and provides the one or more converted objects to the one or more database servers to be called by a user by inputting a uniform resource identifier. In general, the one or more objects include one or more analytic database service data objects specifying one or more attributes of the analytic database service and one or more analytic database service metadata objects, the one or more analytic database service metadata objects including annotations to one or more of the attributes of the one or more analytic database service data objects to be processed by the one or more database servers to implement the one or more predefined analytic operations.

By providing this functionality a designer can design analytic database services over the interface of the generic database gateway server 108 with reduced effort and with limited or no need to access the implemented code of the analytic database services on the database server 107 or the data and metadata files of the gateway 102.

In one example, the generic database gateway server 108 includes a generic model provider 106, a generic data provider 104, and a non-proprietary protocol services enablement module 105. In this example, the user interface 101 communicates with the gateway 102 over a non-proprietary protocol. In other words, a format of uniform resource identifier received by the gateway 102 from the user interface 101 is formatted according to a non-proprietary format. In addition, the data items (and metadata items) returned from the gateway 102 to the user interface 101 for consumption are formatted according to the non-proprietary format as well. Using a non-proprietary format for communication between the user interface 101 and the gateway 102 of the database system 100 can empower a multitude of users using a variety of software platforms to consume analytic database services. For example, a uniform resource identifier can be input in a web browser to call an analytic database service and receive the returned data in the web browser environment. Additional details concerning example application scenarios of analytic database services provided by a generic gateway as described herein will be discussed below in connection with FIG. 4.

In one example, the non-proprietary protocol is the OData protocol (information regarding the OData protocol can be found, e.g., on www.odata.org). Subsequently, the operation of the generic database gateway server 108 and the database system 100 employing the generic database gateway server 108 are explained by using an example implementation where the OData protocol is employed to allow communication with different user interfaces 101 of user devices. However, the methods and systems described herein are not limited to the OData protocol. Other non-proprietary protocols for delivering database services can also be employed in the methods and systems described herein. Before discussing further details of the generic gateway, several properties of the OData protocol will be discussed in the following sections.

The OData protocol supports "CREATE", "READ", "UPDATE" and "DELETE" database operations. It is built on top of the Hypertext Transfer Protocol. Thus, OData services can be consumed by a wide variety of platforms supporting the Hypertext Transfer Protocol. Database services are requested in the framework of the OData protocol by a uniform resource identifier. In general, the OData protocol defines a predetermined syntax for the uniform resource identifier. Likewise, the OData protocol defines how the returned data has to be formatted. In addition, the OData protocol specifies that one or more metadata objects corresponding to the returned data objects have to be structured in a particular manner. The metadata objects include, e.g., a relationship between different returned data objects.

However, in order to provide analytic database services, the OData protocol has to be modified. In one example, annotations are added in the OData metadata objects. These annotations can be used to implement the analytic database service at the database server 107. In one example, the database server 107 employs SAP ABAP so the analytic database service is to be implemented as an instance of one or more ABAP classes.

The annotated OData metadata objects can still be consumed in the same manner as non-enhanced OData objects, e.g., via the Hypertext Transfer Protocol. Thus, the end user can still launch requests and consume the returned database data via a large variety of non-proprietary platforms. On the other hand, the annotated OData objects allow for the provision of analytic database services which might not be possible when employing the non-enhanced OData objects.

After this short explanation of several features of the OData protocol, it will be discussed subsequently how the generic gateway described herein can support a designer to generate and maintain analytic OData database services. Instead of implementing the analytic database services directly on the database server (which might involve a substantial amount of coding in a comparatively complex environment using proprietary programming languages) or implementing the services on the gateway level, the designer can define analytic database services over the interface of the generic gateway server 108. In this manner, the designer's exposure to ABAP code or OData metadata files can be reduced.

In the example of FIG. 1, the generic gateway server 108 includes a generic model provider 106 to achieve this goal. The generic model provider 106 provides one or more predefined models 109 of analytic database services and corresponding predefined objects 110 with predefined annotations (e.g., OData metadata objects) are provided by the non-proprietary protocol services enablement module 105. The designer can select one of the predefined models, customize it according to the requirements of a current analytic database service, and then convert the customized model into one or more objects that can be processed on the one or more database servers. The customization steps might not require accessing, by the designer, the ABAP or OData metadata objects of a particular analytic database service.

For instance, an interface of the generic gateway server 108 can provide a graphical user interface including a table for customizing the attributes of a predefined object. This process will be described in more detail below in connection with FIG. 3 below. After the designer has customized one or more attributes of a predefined model, the non-proprietary protocol services enablement module 105 can convert the customized model into one or more OData database service data objects and corresponding OData metadata objects. In particular, one or more annotations in one or more of the OData metadata objects can be set automatically by the non-proprietary protocol services enablement module 105. In other examples, one or more annotations are explicitly defined by a designer.

The objects of the analytic OData service customized by the designer via the interface as described in the previous section can be translated into corresponding ABAP classes which can be implemented on the one or more database servers 107. Then, the analytic database service so defined is ready for consumption by a user. A user can send a uniform resource identifier to the gateway 102 to call an analytic database service. The uniform resource identifier will be routed through the generic gateway server.

An example uniform resource identifier could have the following format http://EM_SRV/ProductWorkItemCollection?Stop=20&$orderby=name. In this example, an analytic database service named "EM_SRV" is requested by the user. In particular, the user requests certain data objects named "ProductWorkItemCollection." For example, these data objects could be associated with a predefined key performance indicator (e.g., a list of sales activities of the previous week and the number of items in this set of last week's sales activities as analytic aggregate). In addition, the user has defined query options. In the present example the user requests the top 20 entries ordered by name. This example merely illustrates how a uniform resource identifier can be structured. In other examples, the uniform resource identifier can have other formats.

Figure 2:
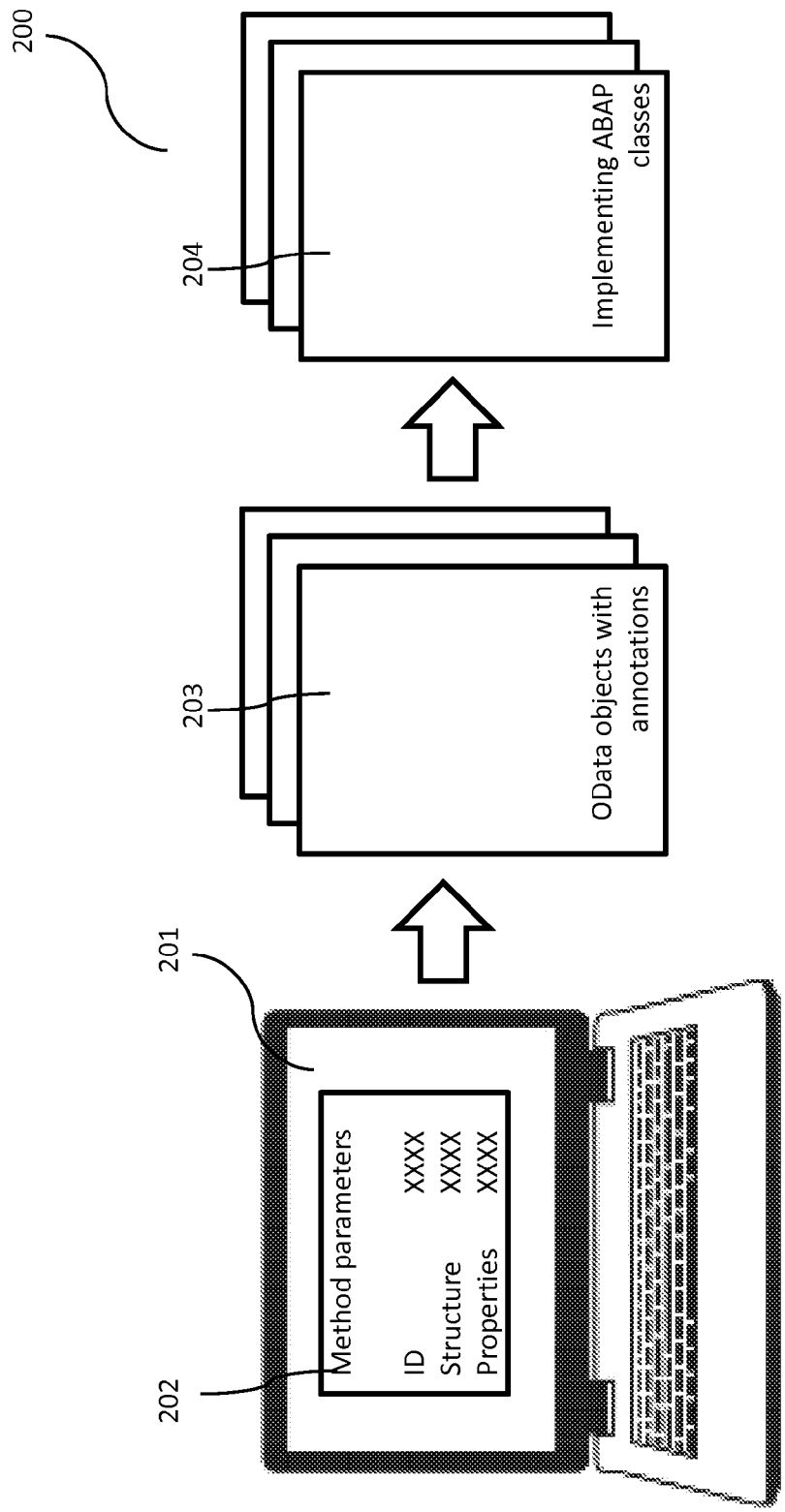
FIG. 2 illustrates the process of creating an analytic database service via a generic gateway server.

At the database server 107, one or more objects defined at the generic database gateway server 108 during design time corresponding to the obtained uniform resource identifier are selected and instantiated. In a subsequent operation, the analytic operations specified in the one or more objects are executed at the one or more database servers 107. The generic gateway server 108 provides a generic channel to return the enriched (i.e., annotated) database data to the user for consumption. In the example of FIG. 2, the generic data provider 104 can provide a generic channel for the predefined types of analytic database services provided by the generic model provider 106.

In the previous paragraphs, the operation of the generic gateway server has been discussed on a general level. Subsequently, different aspects of the generic gateway server will be discussed in more detail in connection with FIG. 2.

A designer can access the generic gateway server via a user device 201. The depicted laptop in FIG. 2 merely serves for illustration purposes. As described above, any suitable user device can be used to access the generic gateway server. An interface 202 of the generic gateway server is displayed on the user device 201. In some examples, the designer can define all properties of an analytic database service via the interface, without the requirement to access OData or ABAP objects 203, 204. The respective OData objects 203 are created or modified (e.g., by the non-proprietary protocol services enablement module 105 in FIG. 1) in an automated fashion in response to a corresponding input of the designer on the interface 202 of the generic gateway. In other examples, the OData objects 203 are created or modified at least partially in an automated fashion (e.g., one or more annotations can be added the OData metadata objects). An example interface 201 will be described subsequently for the sake of illustration.

The user interface 201 can include one or more tables to define methods of an analytic OData service. In one example, the tables can be arranged as different tabs of the user interface 201. In addition or alternatively, then interface 201 can provide a dialog structure to walk the designer through multiple steps in the definition process of an analytic OData service. In both examples, a designer can select, in a first operation, a predefined general type of analytic database services (e.g., an analytic database service that serves a key figure to a user device). The generic gateway holds predefined OData objects and corresponding implementing APAP classes for the predefined general types of analytic database services. When the designer has selected a predetermined general type in a first operation a predefined general types of analytic database service, the user interface is populated. For instance, the user interface 201 can present to the designer a representation of an entity data model of the selected predefined general type of analytic database service. The entity data model can model an analytic database service from a business intelligence perspective. An entity data model can include entity sets including one or more entities of a predetermined entity type. An entity type is a data type that contains a specific type of data from a business intelligence perspective. Examples of entity types are a "customer type," a "supplier type," an "employee type," or a "sales order type." In one example, an entity type can be a "key figure type." As becomes clear from these examples, an entity type can have any data format ranging from singular datum (e.g., an integer number or a string) to a complex data structure (e.g., different data tables organized in a predetermined manner).

The user interface 201 can allow the designer to select, replace, or add entity types in the selected general analytic database service and thereby customize the general analytic database service. In addition or alternatively, the user interface 201 can provide selection means to define semantics of attributes of an entity type. In one example, a designer can select if a predetermined attribute of an entity type is a dimension, a measure, or a key. In this context, the term "dimension" refers to a grouping of data items which are logically connected. For example, a dimension can be a "country dimension" in a sales order data item, which indicates the country in which the respective sales took place. In other examples a dimension can be a "supplier dimension" or a "customer dimension" in a shipment data items which indicate a supplier or a customer for a particular shipment. Further, in this context, the term "measure" refers to a data item which is obtained by applying one or more analytic operations on other data items. For instance, a measure can be an aggregate or average of a selection of database data items. In other examples, a measure can be determining a minimum, maximum, or count of a selection of database data items. In still other examples, a measure can include sorting or filtering a selection of database data items according to one or more criteria. For instance, a sales volume of a company can be a measure as it is determined by an aggregation of all the values of sales data items of this particular company. Last, in this context, a "key" indicates that an attribute of the analytic database service data object is a key of the analytic database service. When the user chooses a customization operation as described above, the corresponding customization is propagated into the OData objects 203 and the ABAP objects 204 related to the respective analytic OData database service. The changes can be propagated in an automated manner to the OData objects 203 and the ABAP objects 204.

In one example, the generic gateway sets annotations in OData metadata objects 203 in an automated manner. For instance, the OData metadata object can include, for each attribute of an entity type of the analytic OData database service, a role annotation being set if the respective attribute is a measure or a dimension and indicating the respective role of the attribute. In addition, the OData metadata object can include a key annotation which indicates that an attribute of the analytic database service data object is a key of the analytic database service. Other example annotations include a semantics annotation, which indicates if that a database service allows analytic operations, user interface annotations defining how returned processed database data is to be presented on an interface of a user device consuming the analytic database service, a reference text annotation which includes a description of an annotated attribute, a reference attribute annotation which specifies one or more reference attributes which are semantically connected to the annotated attribute or a sortable status annotation or a filterable status annotation which indicate that an annotated attribute can be used for sorting or filtering in a user interface. In addition annotations can be defined (e.g. application specific annotations) that give a consumer of a service an indication of behavior of an analytic database service or an instruction of usage for the analytic database service. In one example, an attributes can have an annotation that indicates how performance critical it is to return a value for this attribute. For instance, an analytic database service can have an attribute that requires central processing unit expensive calculations and thus can substantially increase response time for the service if the service is to be executed on a sizable data set. If the consumer knows this status of the attribute he or she could refrain from requesting this attribute for a sizable data set but rather request it for, e.g., single data item.

These annotations can be set by the by the generic gateway in an automated manner or can be set by the designer in a predefined OData metadata object. If, for instance, the designer chooses that a different attribute should be the key of an entity type of a current analytic OData service, he or she can select the particular attribute in the user interface 202 of the generic gateway (e.g., by checking a check box). The generic gateway processes this designer interaction with the user interface 202 and sets a corresponding annotation in the OData metadata object 203. In addition, a corresponding implementing ABAP object can be updated in an automated manner 204. In this way, a designer's exposure to OData objects and ABAP objects can be reduced. The coding effort can be shifted to the generation of the predefined types of analytic database service which can be provided by as general types by the generic gateway. In the subsequent customization phase a designer can resort to the predefined general types of analytic OData services and does not have to create new services from scratch.

Figure 3:
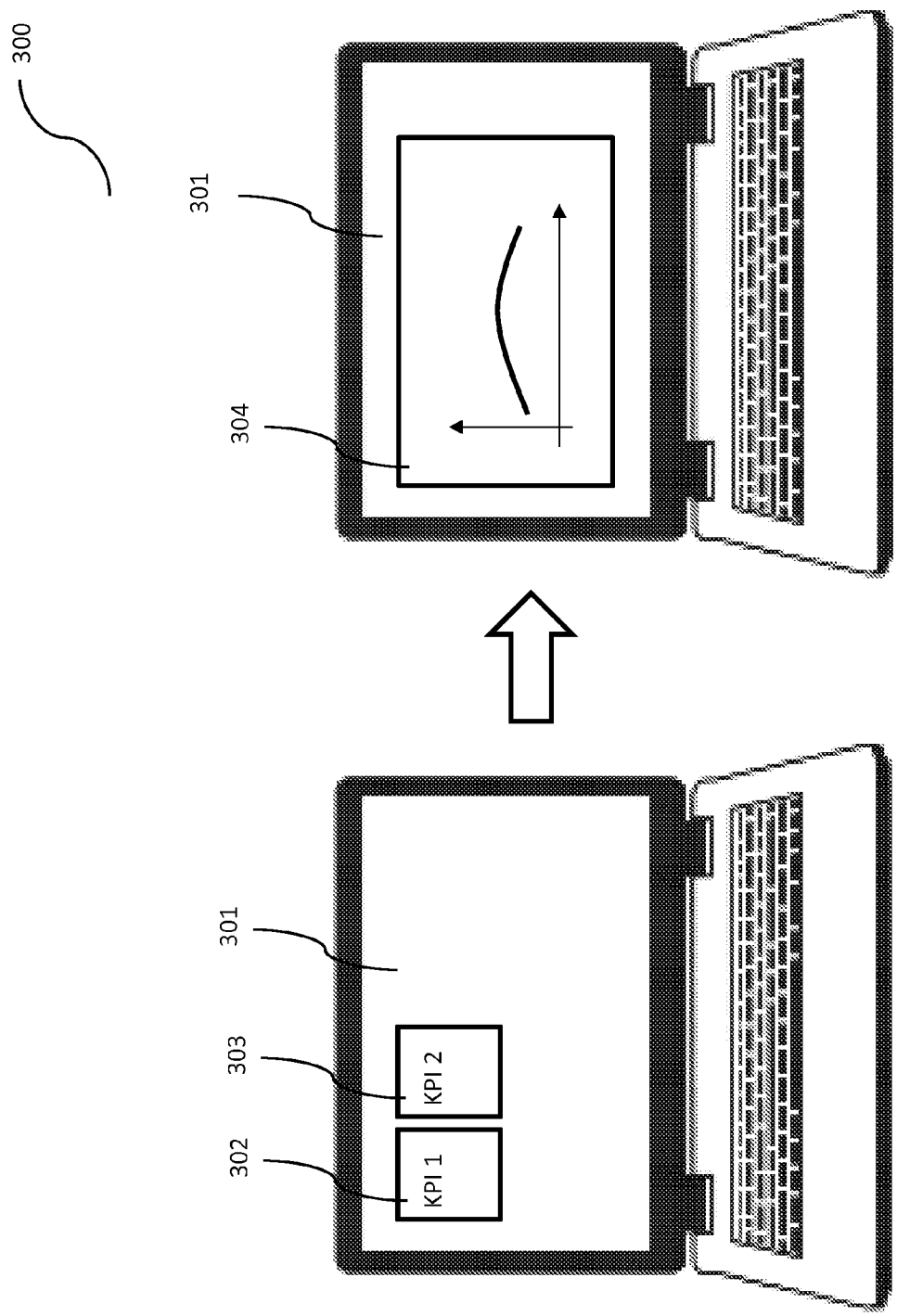
FIG. 3 illustrates an example process for consuming an analytic database service via a generic gateway channel.

An example consumption process 300 of an analytic OData service is illustrated in FIG. 3. In the example of FIG. 3, aggregated measures of two analytic OData services can be served to a user via a corresponding tile 302, 303 rendered on a user interface of the user device 301. For instance, each tile can correspond to one key performance indicator (KPI) and indicate a characteristic measure of the key performance indicator. In the example of FIG. 3, the first key performance indicator can be a total turnover per day for a predetermined customer for the United States. As can be seen in this example, calculating this first key performance indicator requires analytic operations (i.e., aggregation and filtering operations). Thus, standard OData requests might not be suitable to deliver the first key performance indicator. By using an analytic OData request as described above, the first performance indicator can be served to the user device 301 without losing the capability of inter-platform compatibility. The first key performance indicator can be requested by sending a standard uniform resource indicator to a generic gateway server, as described above.

As depicted on the left hand side of FIG. 3, a user can select one of the key performance indicator tiles 302, 303 to display additional details regarding the particular key performance indicator. For example, in the case of the first key performance indicator being a total turnover for a 30 days period for a predetermined customer for the United States a graph 304 showing the turnover for the particular customer for the United States per day can be displayed. The additional data required and the definitions of the detailed view can also be included in the returned OData data and metadata objects. All these functionalities can be designed by a designer by using the above described general gateway.

Figure 4:
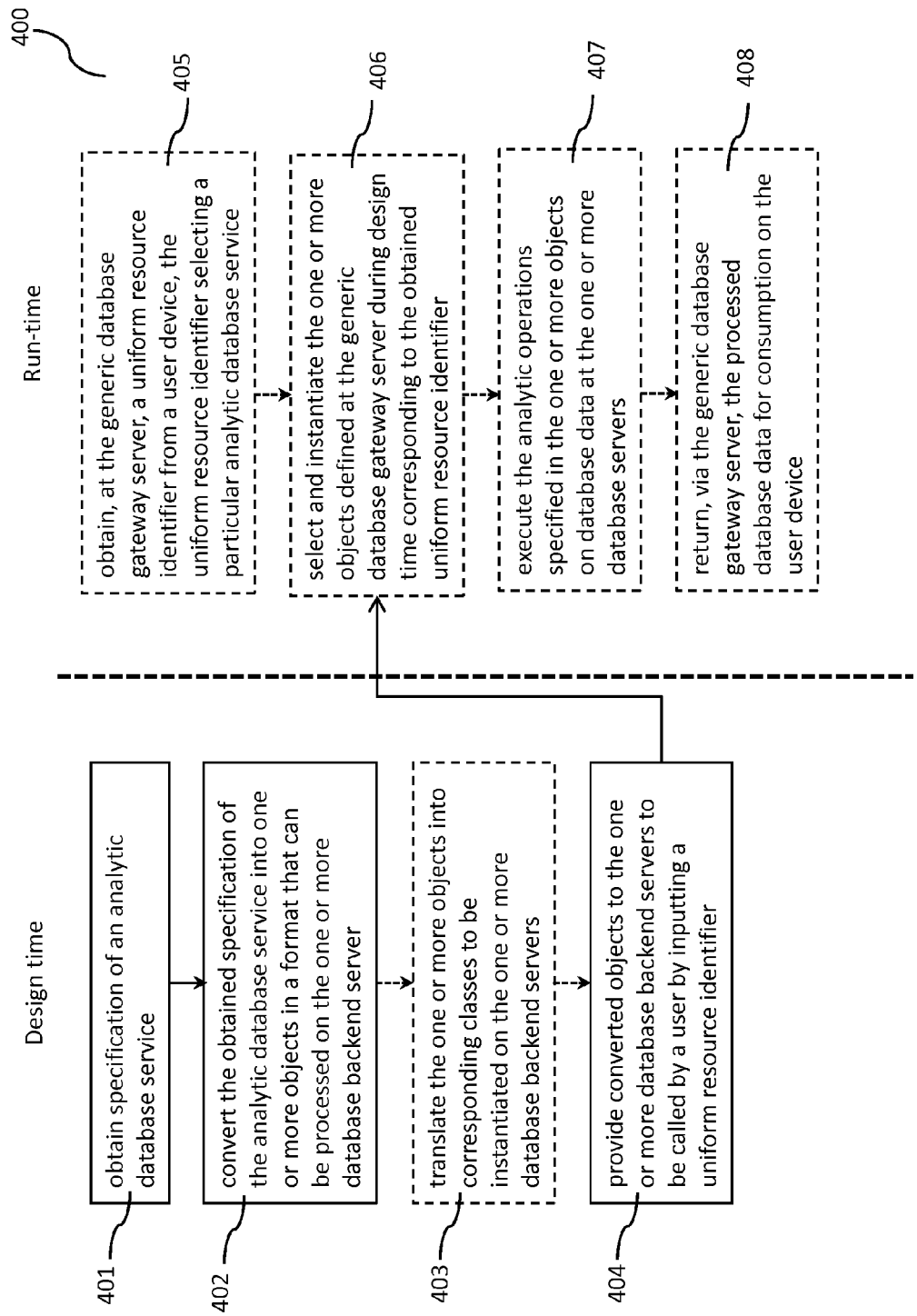
FIG. 4 illustrates an example computer implemented method for creating and consuming an analytic database service via a generic gateway server.

In FIG. 4, design-time and run-time methods for creating and consuming an analytic database service via a generic gateway server are illustrated. On the left hand side, a creation or modification method of an analytic database service is illustrated. In a first operation 401, at a generic gateway interface, a specification of an analytic database service is obtained by selecting database data of the one or more database servers and one or more analytic operations to be applied on the selected data by the analytic database service. In a subsequent operation 402, the obtained specification of the analytic database service is converted into one or more objects in a format that can be processed on the one or more database servers, the one or more objects including one or more analytic database service data objects specifying one or more attributes of the analytic database service and one or more analytic database service metadata objects. The one or more analytic database service metadata objects can include annotations to the attributes of the one or more analytic database service data objects to be processed by the one or more database servers to implement the one or more predefined analytic operations. In a further operation 404, the one or more converted objects are provided to the one or more database servers to be called by a user by inputting a uniform resource identifier. This can include translating 403 the one or more objects into corresponding classes to be instantiated on the one or more database backend servers.

During run-time, in a first operation 405, a uniform resource identifier can be obtained at the generic database gateway server, the uniform resource identifier selecting a particular analytic database service. In a subsequent operation 406, the one or more objects defined at the generic database gateway server during design time corresponding to the obtained uniform resource identifier can be selected and instantiated. In a further operation 407, the analytic operations specified in the one or more objects are executed on database data at the one or more database servers. In a subsequent operation 408, the processed database data is returned, via the generic database gateway server, for consumption on the user device.

At a high level, the servers and other components of a database system described above as functional units are associated with a computer or processor. A computer or processor comprises an electronic computing unit (e.g., a processor) operable to receive, transmit, process, store, or manage data and information associated with an operating environment of the database system. As used in the present disclosure, the term "computer" or "processor" is intended to encompass any suitable processing device. The term "processor" is to be understood as being a single processor that is configured to perform operations as defined by one or more aspects described in this disclosure, or the "processor" comprises two or more processors, that are configured to perform the same operations, e.g. in a manner that the operations are distributed among the two or more processors. The processor may comprise multiple organic field-effect transistors or thin film transistors or a combination thereof. This may allow processing the operations in parallel by the two or more processors. The two or more processors may be arranged within a supercomputer, the supercomputer may comprise multiple cores allowing for parallel processing of the operations. For instance, computer or processor may be a desktop or a laptop computer, a cellular phone, a smartphone, a personal digital assistant, a tablet computer, an e-book reader or a mobile player of media. Furthermore, the operating environment of the database system can be implemented using any number of servers, as well as computers other than servers, including a server pool. Indeed, the computer or processor and the server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the computer, processor and server may be adapted to execute any operating system, including Linux, UNIX, Windows, Mac OS, iOS, Android or any other suitable operating system.

The term "computing device", "server" or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures. In enterprise systems, there are OLTP (OnLine Transaction processing) systems used to carry out business processes of a company where employees and other stakeholders, such as suppliers or customers, follow a business process which may result in business documents created in a database of the OLTP system. The database system can include in-memory databases in addition to the persistent databases described in connection with FIGS. 1 and 2 and thereby exploit recent innovations in hardware to run a database in main memory. In an implementation of the present disclosure described herein, the servers may be types of a Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC), a ByDesign platform, SuccessFactors Platform, ERP Suite technology or in-memory database such as High Performance Analytic Appliance (HANA) platform. In an aspect, the servers may be based on two different of the above mentioned platforms.

Regardless of the particular implementation, "software" or "operations" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and R, Perl, any suitable version of 4GL, as well as others.

The figures and accompanying description illustrate example processes and computer-implementable techniques. However, the database system operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the operations in these processes may take place simultaneously, concurrently, and/or in different orders or combinations than shown. Moreover, operating environment may use processes with additional operations, fewer operations, and/or different operations, so long as the methods remain appropriate.

Aspects of the subject-matter and the operations described in this specification can be implemented in digital electronic circuitry, semiconductor circuits, analog circuits, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) or "user interface" can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) "icons", some or all associated with a web browser, such as interactive fields, pull-down lists, and buttons operable by the user of the computing device hosting the UI. These and other UI icons may be related to or represent the functions of the web browser. The term "browser user interface" refers to a graphical user interface embedded in a web browser environment on the remote computing device. The browser user interface may be configured to initiate a request for a uniform resource locator (URL) and may be configured to display a retrieved web page such as an HTML coded web page. The browser user interface may comprise displayed or hidden icons which, upon activation, initiate an associated electronic process inside or outside the remote computing device. For example, the browser user interface may be Internet Explorer, Chrome or Firefox. "Creating an icon" is to be understood as generating a new icon on the user interface. "Modifying an icon" is to be understood as changing a property of an existing icon on the user interface. "Deleting an icon" is to be understood as vanishing an existing icon on the user interface, e.g., for replacement by a newly created icon. "Updating the user interface" thereby is to be understood as creating, modifying, or deleting an icon on the user interface.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer or computer or processor may be a processor for performing actions in accordance with instructions and one or more memory devices for storing instructions and data. Generally, a computer or computer or processor will also include, or be operatively coupled to receive data from or transfer data to, or both, one or more mass storage devices for storing data, e.g., magnetic, magneto optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the user interface described in this specification can be implemented on a computer having a non-flexible or flexible screen, e.g., a CRT (cathode ray tube), LCD (liquid crystal display) or OLED (organic light emitting diode) monitor, for displaying information to the user and a keyboard and a pointer, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or computer or processor can interact with a user by sending documents to and receiving documents from a device that is used by the user; for example, by sending web pages to a web browser on a user's user device in response to requests received from the web browser.

Implementations of the subject-matter described in this specification can be implemented in a computing system that includes a back end component, e.g., as a server, or that includes a middleware component, e.g., an application server, or that includes a front end component, e.g., a user computer having a graphical user interface or a Web browser through which a user can interact with an implementation of the subject-matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementation or on the scope of what may be claimed, but rather as descriptions of features that may be specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A database system, the database system comprising:
one or more database servers configured to serve database data of a database and configured to provide database services; and
a generic database gateway server coupled to the one or more database servers, the generic database gateway server configured to provide an interface to define analytic database services called during run-time by inputting a uniform resource identifier at a user device to provide to the user device with database server data processed by one or more predefined analytic operations, the generic database gateway server being configured to:
obtain, during design time, a specification of an analytic database service by selecting database server data of the one or more database servers and one or more analytic operations to be applied on the selected database server data by the analytic database service, wherein the specification of the analytic database service specifies at least the selected database server data and the selected one or more analytic operations;
convert the obtained specification of the analytic database service into one or more objects in a format that can be processed on the one or more database servers, wherein the one or more objects include:
one or more analytic database service data objects specifying one or more attributes of the analytic database service; and
one or more analytic database service metadata objects, the one or more analytic database service metadata objects including annotations to the attributes of the one or more analytic database service data objects to be processed by the one or more database servers to implement the one or more predefined analytic operations; and
provide the one or more converted objects to the one or more database servers to be called by a user by inputting a uniform resource identifier.

2. The database system of claim 1, wherein the generic database gateway server is configured to automatically generate one or more of the annotations in the one or more analytic database service metadata objects in response to a corresponding input in the interface of the generic database gateway server by a designer.

3. The database system of claim 1, wherein the generic database gateway server provides one or more predefined types of analytic database services and corresponding predefined objects with predefined annotations in a format that can be processed on the one or more database servers, wherein the generic database gateway server is further configured to:
obtain, during design time, a selection of a predefined type of analytic database service;
obtain, during design time, one or more designer inputs for customizing the predefined type of analytic database service;
adapt the predefined type of analytic database service based on the one or more designer inputs.

4. The database system of claim 1, wherein the one or more database servers employ a proprietary programming language to implement database services.

5. The database system of claim 4, wherein the proprietary programming language employed to implement database services is SAP ABAP.

6. The database system of claim 4, wherein the one or more objects generated by the generic database gateway server are formatted according to a non-proprietary protocol with additional annotations.

7. The database system of claim 6, wherein the non-proprietary protocol is an Open Data Protocol.

8. The database system of claim 1, wherein the interface of the generic database gateway server provides an environment where a designer explicitly defines annotations in more analytic database service metadata objects.

9. The database system of claim 1, wherein the database system is configured to translate the one or more objects generated at the generic database gateway server into corresponding classes to be instantiated on the one or more database servers.

10. The database system of claim 1, wherein the annotations include one or more of the following:
one or more role annotations, which indicate that an attribute of the analytic database service data object is a dimension or a measure, wherein a dimension refers to a grouping of data items which are logically connected and a measure refers to a data item obtained by applying one or more analytic operations on other data items, or
a key annotation which indicates that an attribute of the analytic database service data object is a key of the analytic database service, or
a semantics annotation, which indicates that a database service allows analytic operations, or
one or more user interface annotations defining how returned processed database server data is to be presented on an interface of a user device consuming the analytic database service, or
a reference text annotation which includes a description of an annotated attribute, or
a reference attribute annotation which specifies one or more reference attributes which are semantically connected to the annotated attribute, or
a sortable status annotation or a filterable status annotation providing an indication for using an annotated attribute for sorting or filtering in a user interface.

11. The database system of claim 1, wherein the generic database gateway server is configured to provide a graphical user interface for a designer to specify the database server data and the one or more analytic operations.

12. The database system of claim 11, wherein the graphical user interface is configured to:

receive a selection of a predefined analytic database service by the designer;
present a representation of the properties of the predefined analytic database service to a designer;
allow the designer to customize one ore more properties of the predefined analytic database service; and
adapt the one or more objects of the predefined analytic database service upon receiving a customization by the designer.

13. The database system of claim 12, wherein adapting the one or more objects of the predefined analytic database service includes setting or changing one or more annotations in the one or more analytic database service metadata objects of the analytic database service.

14. The database system of claim 1, wherein the database system is configured, during run-time, to:
obtain, at the generic database gateway server, a uniform resource identifier from a user device, the uniform resource identifier selecting a particular analytic database service;
select and instantiate the one or more objects defined at the generic database gateway server during design time corresponding to the obtained uniform resource identifier;
execute the analytic operations specified in the one or more objects on database server data at the one or more database servers; and
return, via the generic database gateway server, the processed database server data for consumption on the user device.

15. The database system of claim 14, wherein the returned processed data is formatted according to a non-proprietary language, wherein the non-proprietary language is an Extensible Markup Language.

16. The database system of claim 14, wherein the returned processed database data includes one or more database tables.

17. The database system of claim 14, wherein the database system is configured to obtain the uniform resource identifier via a Hypertext Transfer Protocol connection.

18. The database system of claim 1, wherein the database server data includes database data, runtime data one or more database servers, or both.

19. A computer implemented method, including:
obtaining, during design time, a specification of an analytic database service by selecting database server data of the one or more database servers and one or more analytic operations to be applied on the selected database server data by the analytic database service, wherein the specification of the analytic database service specifies at least the selected database server data and the selected one or more analytic operations;
converting the obtained specification of the analytic database service into one or more objects in a format that can be processed on the one or more database servers, wherein the one or more objects include:
one or more analytic database service data objects specifying one or more attributes of the analytic database service; and
one or more analytic database service metadata objects, the one or more analytic database service metadata objects including annotations to the attributes of the one or more analytic database service data objects to be processed by the one or more database servers to implement the one or more predefined analytic operations; and
providing the one or more converted objects to the one or more database servers to be called by a user by inputting a uniform resource identifier.

20. A computer readable medium storing instructions thereon which when executed by a processor cause the processor to:
obtain, during design time, a specification of an analytic database service by selecting database server data of the one or more database servers and one or more analytic operations to be applied on the selected database server data by the analytic database service, wherein the specification of the analytic database service specifies at least the selected database server data and the selected one or more analytic operations;
convert the obtained specification of the analytic database service into one or more objects in a format that can be processed on the one or more database servers, wherein the one or more objects include:
one or more analytic database service data objects specifying one or more attributes of the analytic database service; and
one or more analytic database service metadata objects, the one or more analytic database service metadata objects including annotations to the attributes of the one or more analytic database service data objects to be processed by the one or more database servers to implement the one or more predefined analytic operations; and
provide the one or more converted objects to the one or more database servers to be called by a user by inputting a uniform resource identifier.

* * * * *